United States Patent [19]
Treiber

[11] Patent Number: 5,768,983
[45] Date of Patent: Jun. 23, 1998

[54] HIGH TEMPERATURE WOOD SMOKER

[76] Inventor: Rodney Treiber, 1630 Greenbriar Ct., Jeffersonville, Ind. 47120

[21] Appl. No.: 726,838

[22] Filed: Oct. 8, 1996

[51] Int. Cl.⁶ .............................. A47J 37/07; A47J 37/04
[52] U.S. Cl. ........................ 99/482; 99/449; 126/275 R; 126/9 R
[58] Field of Search .............................. 99/482, 483, 473, 99/449, 413; 126/9 R, 275 R, 369

[56] References Cited

U.S. PATENT DOCUMENTS

| | | | |
|---|---|---|---|
| 1,103,169 | 7/1914 | Beam | 126/275 R |
| 1,711,631 | 5/1929 | Burnett | 126/275 R |
| 2,641,246 | 6/1953 | Guthof | 126/275 R |
| 3,786,741 | 1/1974 | Plumley et al. | |
| 4,190,677 | 2/1980 | Robins | |
| 4,721,037 | 1/1988 | Blosnich | 99/482 |
| 4,724,756 | 2/1988 | Sarparanta | |
| 5,211,105 | 5/1993 | Liu | |
| 5,458,054 | 10/1995 | Yu | |

*Primary Examiner*—Reginald L. Alexander
*Attorney, Agent, or Firm*—Ancel W. Lewis, Jr.

[57] ABSTRACT

A wood smoker comprises an outer cooking container, an inner cooking container, and a cover for the inner cooking container. The outer cooking container is provided with a bottom wall which receives wood chips and the like thereon and the inner cooking container is provided with a bottom wall with smoke flow apertures therein wherein pre-portioned foods are placed on the bottom wall of the inner cooking container, the bottom wall of the inner cooking container being spaced from the bottom wall of the outer cooking container. Wood chips and the like which are ignited provides smoke which flows up through the apertures in the bottom wall of the inner container and along with the heat being generated by the bottom wall of the outer container and the ignited wood chips provides the smoke and cooking heat for the pre-portioned food products on the surface of the bottom wall of the inner cooking container.

22 Claims, 3 Drawing Sheets

HIGH TEMPERATURE WOOD SMOKER

BACKGROUND OF THE INVENTION

The present invention relates to a high temperature wood smoker for cooking and smoking portions of meats, seafoods, poultry and other food products. More particularly, the present invention relates to a wood smoker wherein meats, seafood and poultry can be cooked and smoked in a relatively short period of time.

Meats, seafoods and poultry having the taste of smoked wood, such as hickory and mesquite and other sources for flavoring, have acquired wide acceptance in our society. In many instances, the cooking and smoking of these products using wood chips as the source for the heat and smoke take many hours in preparation. Moreover, in restaurants, and particularly fast food restaurants, when cooked foods with a smoke taste are prepared the food products are generally marinated or grilled with a liquid smoke as opposed to actual smoking the food product. In restaurants, and particularly those of the fast food variety, a wood cooker-smoker which prepares a smoked food product in a very short period of time would increase efficiency and provide more authenticity to the prepared food over those using liquid smoke in the food preparation process.

SUMMARY OF THE INVENTION

It is a principal object of the present invention to provide an apparatus for smoke cooking portions of meats, seafoods, poultry, and other food products.

It is another object of the present invention to provide a wood smoker wherein wide varieties of foods can be smoked quickly in time constraints demanded in commercial eating establishments.

It is even a further object of the present invention to provide a wood smoker which is relatively inexpensive and easily assembled.

More particularly, the present invention provides a wood smoker comprising an outer cooking container having a closed bottom and an open top; an inner cooking container having an outer diameter less than the inner diameter of said outer cooking container, said inner cooking container having a bottom with smoke flow apertures therein and an open top, the inner cooking container being received within the outer cooking container; means to space the inner cooking container bottom above the outer cooking container bottom; and, cover means for the open top of said inner cooking container.

Accordingly, other objects and advantages of the present invention will be apparent by reference to the following description of preferred embodiments, drawings and appended claims.

DETAILED DESCRIPTION OF THE PREFERRED EMBODIMENT

Figure 1:
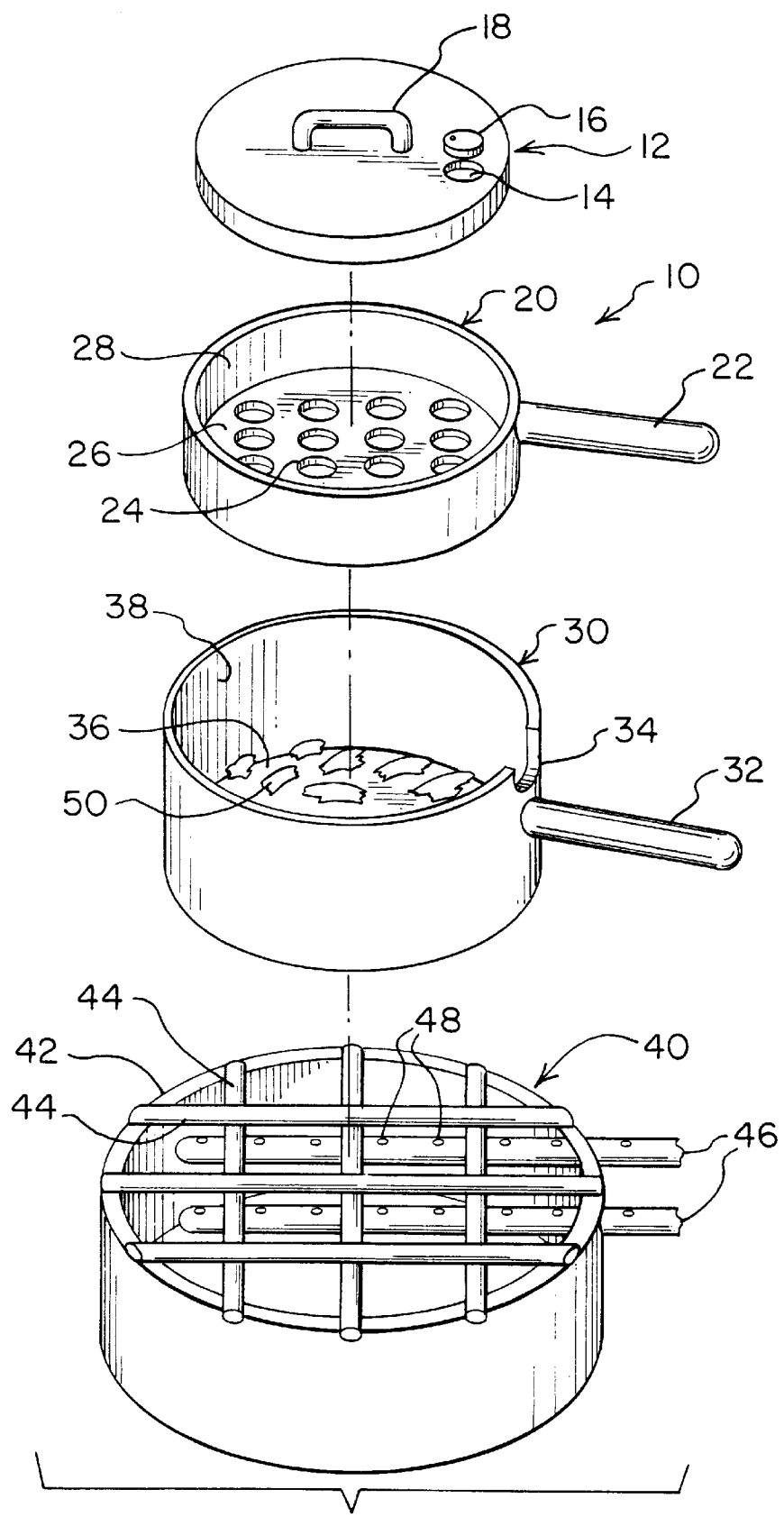
FIG. 1 is an exploded perspective view of one preferred embodiment of the present invention.

Turning now to the drawings, as best shown in FIG. 1, a smoke cooker assembly 10 of the present invention includes a cover 12, inner cooking container 20 and an outer cooking container 30 which receives the inner cooking container 20 therein. The cover 12, which is for the inner cooking container 20, is generally of cast iron but may be aluminum or the like and is generally provided with an air flow vent 14 with an air flow vent cover 16 which is pivotally attached to the top of the cover 12 thereby allowing for selective closing of the vent 14 when in use. A handle 18 is also provided for easy removal of the cover 12 from the inner cooking container 20.

The inner cooking container 20 which is also generally of cast iron but may be of aluminum or the like is provided with a bottom 26 having a plurality of openings 24 therein, the openings 24 being flow-through openings to receive the smoke evolving from the smoking of the wood chips 50 in the outer container 30. The bottom 26 is also provided to receive food products, such as meats, seafoods, poultry and the like thereon. And, the inner cooking container 20 is provided with a circumferentially extending sidewall 28.

The outer cooking container 30 includes a bottom 36 and a circumferentially extending sidewall 38. The bottom 36 is provided to receive wood chips 50 and the like thereon which provides the smoke for smoking the meats and the foods to be cooked and smoked in the inner cooking container 20. The wood chips 50 that are provided for the smoker have usually been water soaked overnight or for a selected period of time so that when heat is added to the wood chips, the moisture within the wood chips, along with the ignition of the chips, provides the smoke and heat for the smoking and cooking of the food products. The outer cooking container 30 is generally made of cast iron but may also be aluminum or other materials used for smoking. Also, the outer cooking container 30 may include a handle 32 thereon for easy movement onto and away from a heat source, such as, grill 40.

Figure 2:
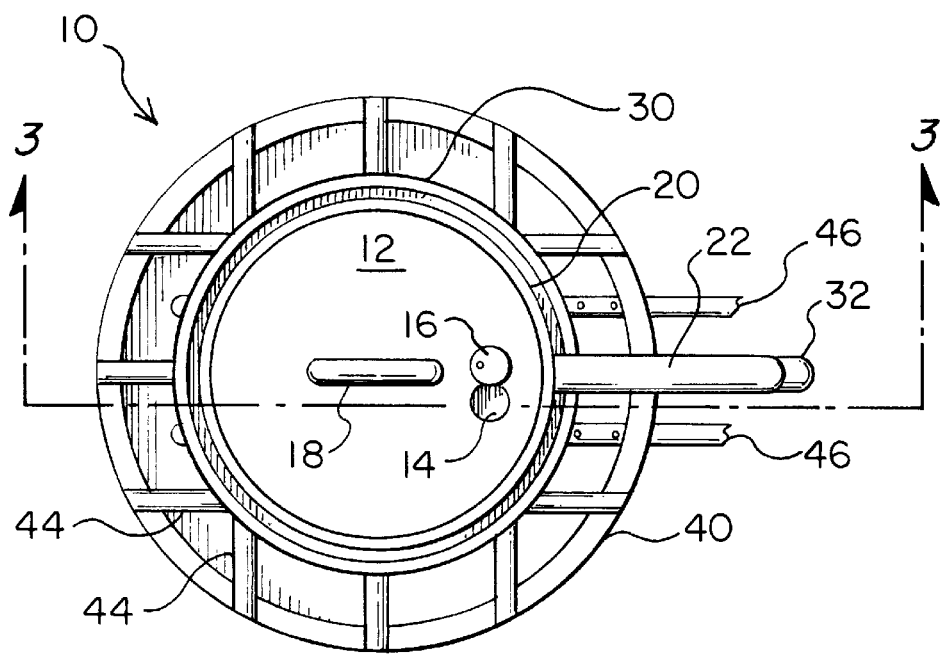
FIG. 2 is a top view of the preferred embodiment of FIG. 1 in combination with a cooking grill.

As best shown in FIGS. 2 and 3, the outer diameter of the sidewall 28 is less than the inner diameter of the circumferentially extending sidewall 38 of outer container 30 so that the inner cooking container 20 fits easily within the outer cooking container 30. Generally, there is very little space between the outer surface of the sidewall 28 and the inner surface of the sidewall 38. The spacing between these walls 28 and 38 is generally less than ¼" in thickness.

Figure 3A:
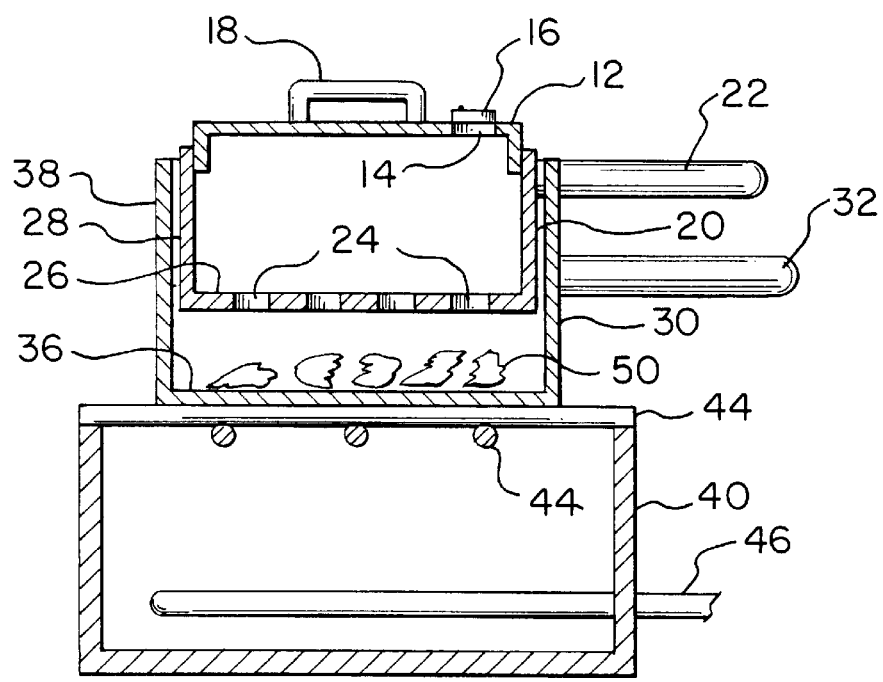
FIG. 3A is a sectional view taken along lines 3—3 of FIG. 2.

The inner cooking container 20 is also provided with a handle 22 for easy removal of the inner cooking container 20 from the outer cooking container 30. Also, the outer cooking container 30 is provided with a notch therein, generally of U-shaped configuration, as best shown in FIG. 1, to receive the handle 22. Moreover, the distance between the bottom portion of the handle 22 and the bottom wall 26 is less than the distance between the lower most portion of the notch 34 and the bottom wall 36 thereby providing for a spacing between the bottom wall 36 of the outer cooking container 30 and the bottom wall of the inner cooking container 20. The spacing between the bottom wall 26 and the bottom 36 is best shown in FIG. 3A.

Figure 3B:
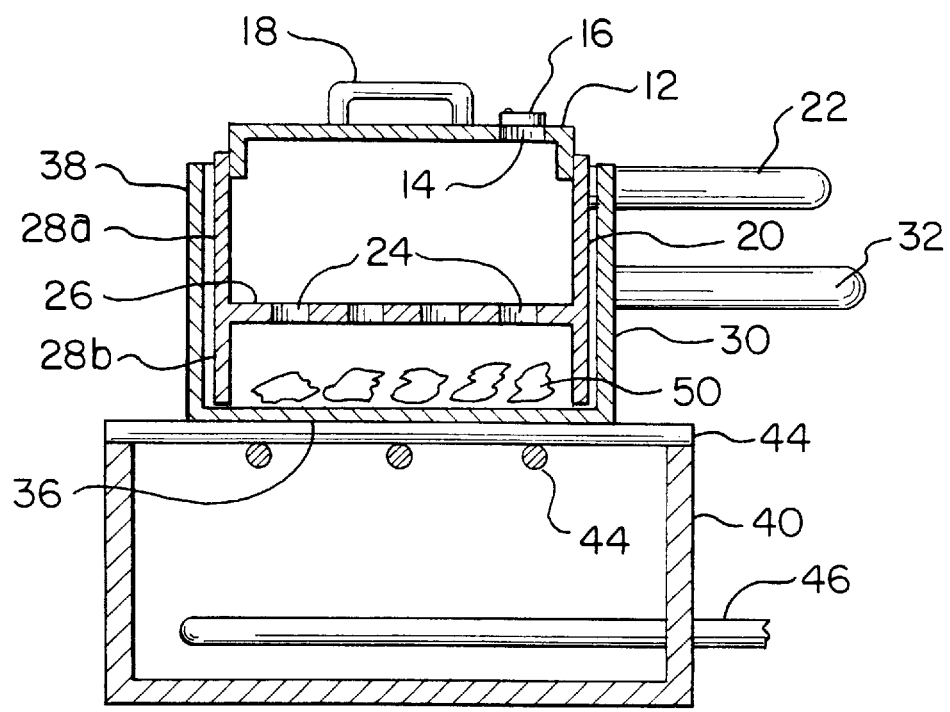
FIG. 3B is a sectional view of an alternative embodiment taken along the lines 3—3 of FIG. 2.

In an alternative embodiment, as shown in FIG. 3B, the container 20 is provided with a circumferential sidewall in two sections. The first or upper section of the sidewall is identified by the numeral 28a, this being the portion of the sidewall that extends above the bottom 26 and the lower portion of the circumferential sidewall is identified by the numeral 28b, this being the sidewall portion that extends below the bottom wall 26. The circumferential sidewall portion 28b is of preselected length and is received by the bottom wall 36 so that the bottom wall 26 is spaced from the bottom wall 36.

As best shown in FIG. 1, a gas grill 40 is provided to provide the heat to the wood smoker 10. A preferred gas grill 40 is provided with a top circumferentially edge 42 which receives a plurality of support rods 44 to provide a grilled framework for the receipt of the outer cooking container 30 thereon. The gas grill 40 is provided with a pair of parallel gas burner lines 46 wherein each gas burner line 46 includes a plurality of gas nozzles 48 therein which, upon ignition, provides the heat for the cooking.

In operation, and particularly in a commercial operation, soaked wood chips 50 are placed into the outer cooking container 30 which in turn is placed upon a grill 40. The grill 40 is preferably gas fueled but may be electric or the like and the temperature of the bottom 36 of the outer cooking container is brought up to a high temperature so that the wood chips are caused to ignite thereby providing the generation of smoke as well as providing heat to the bottom wall 26 for cooking the desired food products thereon. Meats, seafoods, poultry or the like are then placed upon the bottom wall 26 of the inner cooking container 20 and with the bottom 36 having the wood chips 50 thereon already being at a relatively high temperature, such as 700° F. or the like, the pre-portioned foods placed on the bottom 26 are rapidly cooked and simultaneously smoked; and, with the rapid cooking and smoking retains their natural flavors and juices. Moreover, the cover 12 is placed over the inner cooking container 20 during the cooking process to keep the heat within the inner cooking container 20 thereby assisting in this rapid cooking and smoking of the pre-portioned foods.

It is realized that various flavors of wood chips 50 can be used, such as, for example, hickory, apple, mesquite and the like. Herbs and other seasonings may also be added in with the chips. Moreover, smoking and blackening of food products simultaneously may be accomplished with the high temperature smoker-cooker of the present invention.

Moreover, in commercial hotels, restaurants, and particularly in fast food establishments, the outer cooking container 30 may be left on the grill 40 for several hours at a time thereby maintaining heat to the bottom wall 36 so that the cooking surface is kept at the cooking temperature. In this case, since the bottom wall 36 is at a relatively high temperature, such as 700° F., then there is no delay in getting the cooking surface temperature up to a cooking temperature which in many instances requires several minutes before the surface is ready for cooking. Thus, the wood smoker-cooker, as described, is particularly useful in the kitchens of restaurants, bars and hotels which already are concentrating fast cooking of pre-portioned foods. And, the smokers can be provided in many different sizes without departing from the scope and spirit of the present invention.

It is realized that other variations and modifications of the preferred embodiments are possible without departing from the scope and spirit of the present invention. And, it is not intended that the aforementioned discussion in any way limits the scope of the present invention as set forth in the appended claims.

What is claimed is:

1. A wood smoker comprising:

an outer cooking container having a closed bottom and an open top;

an inner cooking container having an outer diameter less than an inner diameter of said outer cooking container, said inner cooking container having a bottom with smoke-flow apertures therein and an open top, said inner cooking container being received within said outer cooking container;

said outer cooking container having wood therein that when burning produces heat and smoke which smoke passes from said outer container through said smoke-flow apertures to smoke a food disposed in said inner container during cooking;

means to space said inner cooking container bottom above said outer cooking container bottom; and, cover means for said open top of said inner cooking container.

2. The wood smoker of claim 1, said means to space said inner cooking container bottom above said outer cooking container bottom including a circular sidewall extension from said inner cooking container bottom a preselected distance downwardly, said inner cooking container circumferential sidewall received by the bottom of said outer cooking container.

3. The wood smoker of claim 1, said cover means including air vent means therein.

4. The wood smoker of claim 1, said wood is in the form of wood chips.

5. A wood smoker as set forth in claim 4 wherein said wood chips are soaked and selected from the group consisting of apple, hickory and mesquite.

6. The combination of claim 5, said cut-out having a bottom portion at a first preselected distance from the closed bottom of said outer cooking container, said handle of said inner cooking container having a lower portion positioned a second preselected distance from said bottom of said inner cooking container, said first preselected distance being greater than said second preselected distance.

7. A wood smoker as set forth in claim 1 wherein said inner container is made of cast iron.

8. A wood smoker as set forth in claim 1 wherein said outer container is made of cast iron.

9. A wood smoker as set forth in claim 1 wherein said bottom of said inner container is at a temperature of about 700° F.

10. A wood smoker as set forth in claim 1 wherein said inner container has an inner sidewall and said outer container has an outer sidewall, the spacing between said inner and outer sidewalls being generally less than ¼ inch in thickness.

11. A wood smoker as set forth in claim 1 wherein said smoke passing through said smoke-flow aperture also blackens said food.

12. In combination with a cooking grill, a wood smoker comprising:

an outer cooking container having a closed bottom and an open top;

an inner cooking container having an outer diameter less than an inner diameter of said outer cooking container, said inner cooking container having a bottom with smoke-flow apertures therein and an open top, said inner cooking container being received within said outer cooking container;

said outer cooking container having wood therein that when burning produces heat and smoke which smoke passes from said outer container through said smoke-flow apertures to smoke a food disposed in said inner container during cooking;

means to space said inner cooking container bottom above said outer cooking container bottom; and, cover means for said open top of said inner cooking container.

13. The combination of claim 12, said means to space said inner cooking container bottom above said outer cooking container bottom including a circular sidewall extension from said inner cooking container bottom a preselected distance downwardly, said inner cooking container circumferential sidewall received by the bottom of said outer cooking container.

14. The combination of claim 12, said cover means including air vent means therein.

15. The combination of claim 12, said wood being in the form of wood chips.

16. A wood smoker comprising:

an outer cooking container having a closed bottom and an open top;

an inner cooking container having an outer diameter less than an inner diameter of said outer cooking container, said inner cooking container having a bottom with smoke-flow apertures therein and an open top, said inner cooking container being received within said outer cooking container, said inner cooking container having a handle, said outer cooking container having a cut-out in an upper portion thereof, said cut-out receiving said handle of said inner cooking container;

means to space said inner cooking container bottom above said outer cooking container bottom; and, cover means for said open top of said inner cooking container.

17. The wood smoker of claim 16, said cut-out having a bottom portion at a first preselected distance from the closed bottom of said outer cooking container, said handle of said inner cooking container having a lower portion positioned a second preselected distance from said bottom of said inner cooking container, said first preselected distance being greater than said second preselected distance.

18. In combination with a cooking grill, a wood smoker comprising:

an outer cooking container having a closed bottom and an open top;

an inner cooking container having an outer diameter less than an inner diameter of said outer cooking container, said inner cooking container having a bottom with smoke-flow apertures therein and an open top, said inner cooking container being received within said outer cooking container, said inner cooking container having a handle, said outer cooking container having a cut-out in an upper portion thereof, said cut-out receiving said handle of said inner cooking container;

means to space said inner cooking container bottom above said outer cooking container bottom; and, cover means for said open top of said inner cooking container.

19. A method of smoking a pre-portioned food product comprising the steps of:

bringing a first cooking surface having wood chips thereon to a preselected cooking temperature;

placing a pre-portioned food product on a second cooking surface, said second cooking surface having flow-through apertures therein;

spacing said second cooking surface above said first cooking surface a preselected distance; and, covering said second cooking surface for a preselected period of time.

20. The method of claim 19, said wood chips being soaked wood chips.

21. The method of claim 20, said wood chips being selected from the group consisting of apple, hickory and mesquite.

22. A method as set forth in claim 19 wherein said second cooking surface is at a temperature of about 700° F.

* * * * *